(12) United States Patent
Nakagawa

(10) Patent No.: US 8,321,945 B2
(45) Date of Patent: Nov. 27, 2012

(54) SECURITY MEASURE STATUS SELF-CHECKING SYSTEM

(75) Inventor: Katsuyuki Nakagawa, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 435 days.

(21) Appl. No.: 12/532,172

(22) PCT Filed: Jun. 3, 2008

(86) PCT No.: PCT/JP2008/060214
§ 371 (c)(1),
(2), (4) Date: Sep. 21, 2009

(87) PCT Pub. No.: WO2008/149859
PCT Pub. Date: Dec. 11, 2008

(65) Prior Publication Data
US 2010/0064342 A1    Mar. 11, 2010

(30) Foreign Application Priority Data
Jun. 5, 2007    (JP) ................................ 2007-148815

(51) Int. Cl.
G06F 11/00    (2006.01)
(52) U.S. Cl. .................................. 726/25; 726/1; 726/22
(58) Field of Classification Search .................. 726/1, 2, 726/22–25
See application file for complete search history.

(56) References Cited

U.S. PATENT DOCUMENTS

| | | | | |
|---|---|---|---|---|
| 6,529,784 B1 * | 3/2003 | Cantos et al. | .................. | 700/79 |
| 6,782,350 B1 * | 8/2004 | Burnley et al. | ................ | 702/186 |
| 2001/0023486 A1 * | 9/2001 | Kayashima et al. | .......... | 713/200 |
| 2002/0095490 A1 * | 7/2002 | Barker et al. | .................. | 709/224 |
| 2005/0102534 A1 | 5/2005 | Wong | | |
| 2005/0120113 A1 * | 6/2005 | Bunch et al. | ................... | 709/224 |
| 2005/0144475 A1 * | 6/2005 | Sakaki et al. | ................. | 713/200 |
| 2005/0246762 A1 * | 11/2005 | Girouard et al. | ................... | 726/2 |
| 2006/0020814 A1 * | 1/2006 | Lieblich et al. | ............... | 713/182 |

FOREIGN PATENT DOCUMENTS

| | | |
|---|---|---|
| JP | 10-171844 A | 6/1998 |
| JP | 2004-355450 A | 12/2004 |
| JP | 2004-362075 A | 12/2004 |
| JP | 2006-243791 A | 9/2006 |
| WO | 2006/019513 A2 | 2/2006 |

* cited by examiner

Primary Examiner — Nirav B Patel
(74) Attorney, Agent, or Firm — Mattingly & Malur, PC

(57) ABSTRACT

A security measure status self-checking system which can determine the security measure status in a more simplified and effective manner by focusing on the information leakage measure in the security measures, managing the PC's security measure status and the user's take-out operation status in an integrated and unitary manner, and providing security policy samples. Accordingly, the client computer collects security inventory information and operation log information and transmits the information to the server computer. Further, the server computer stores the security inventory information and the operation log information transmitted from the client computer and determines whether or not the information conforms to the security policy which has been set in advance. The check result is displayed on the server computer and when a policy violation is detected, the manager and the client are notified of that effect.

5 Claims, 9 Drawing Sheets

FIG. 3

| Information leakage measure checking policy | Information leakage measure checking condition |
|---|---|
| Encryption | Whether or not the necessary software is introduced |
| Take-out control software | Whether or not the necessary software is introduced |
| Illegal application execution | Whether or not the illegal application is executed |

| Anti-virus measure checking policy | Anti-virus measure checking condition |
|---|---|
| Anti-virus measure software | Whether or not the necessary software is introduced |
| Pattern definition file | Whether or not the pattern definition file is correctly updated |
| Virus scan execution status | Whether or not the virus scan is executed periodically |

| OS security measure checking policy | OS security measure checking condition |
|---|---|
| OS security patch | Whether or not the necessary security patch is applied |

FIG. 4

| Policy category 401 | Checking policy 405 | Check 406 | Warning level 407 | Caution level 408 | Warning at violation 409 |
|---|---|---|---|---|---|
| Information leakage measure 402 | Encryption | Present | 5 | 1 | None |
| | Take-out control software | Present | 20 | 10 | Desktop warning |
| | Illegal application execution | Present | 30 | 10 | Email warning |
| Anti-virus measure 403 | Anti-virus measure software | Present | 10 | 5 | Desktop warning |
| | Pattern definition file | Present | 20 | 10 | Email warning |
| | Virus scan execution status | Present | 10 | 5 | None |
| OS security measure 404 | OS security patch | None | - | - | - |

FIG. 6

| Policy category (601) | Checking policy (605) | Check (606) | Warning level (606) | Caution level (607) | Warning threshold (608) | Warning at violation (610) |
|---|---|---|---|---|---|---|
| External media log (602) | Without encryption | Present | 5 | 1 | 1 | Desktop warning (612) |
| | With encryption | Present | 30 | 10 | 5 | None (613) |
| | CD/DVD | None | - | - | - | None |
| Dedicated USB memory log (603) | Dedicated USB memory | Present | 30 | 20 | - | - |
| Print log (604) | Without-watermark | Present | 200 | 10 | 5 | Email warning (611) |
| | With-watermark | None | - | - | - | - |

SECURITY MEASURE STATUS SELF-CHECKING SYSTEM

TECHNICAL FIELD

The present invention relates to a self-checking system which integratedly manages a PC security measure status and a user's take-out operation log difficult to be unitarily managed and automatically checks whether or not to conform to a policy.

BACKGROUND ART

The role of computers in an enterprise is not special, but more and more people use computers and one person may often use one or more computers. There are various background reasons for this: Microsoft Windows (registered trademark) has been widely used as a general purpose OS (Operating System), the internet environment has been put in place, a computer itself has been available inexpensively, and the like.

With a wide use of computers, managers have faced a problem with asset management. Every enterprise needs to not only manage each computer as a hardware asset but also strictly manage software running on the computer from the point of view of compliance. Naturally, the more the number of computers to be managed, the more impossible it is to manually manage. Therefore, management by a system is required, and the number of introductions of asset management tools has been dramatically increasing to solve the above problems. Typical examples of the functions used as the asset management tool include an inventory collection, a software distribution, and a remote control.

The most used one of these functions is the inventory collection. The inventory collection includes collecting not only hardware information and software information about each computer but also the name of a user and the authorized signature from the division to which the user belongs, which are obtained by prompting the user to enter data in a questionnaire format. Recently, such an asset management tool has been increasingly used to understand the security measure status of a computer.

Typical information leakage measures (in a broad sense) cited as one of the security measures include "encryption" and "take-out control". Information leakage measures have spread since the Personal Information Protection Law entirely enforced in 2005 imposes obligations upon businesses handling personal information to take necessary measures for safe management of data, and the like. Regarding the "encryption", the aforementioned asset management tool can be used to check whether or not "encryption" software is correctly installed. However, regarding the "take-out control", even the inventory acquisition function included in the asset management tool cannot confirm the measure status. This is because it is not important for the "take-out control" measures to check whether or not predetermined software is installed, but it is necessary for the "take-out control" measures to check whether or not the measures by the "take-out control" are effectively operated. Therefore, most of the "take-out control" measure products include a function of acquiring logs about the user's operation.

The well known technical documents related to the present invention include the following Patent Document 1. The Patent Document discloses an operation log collection device which collects not only key inputs and pointing device input data but also display output signals to facilitate an analysis when a trouble occurs.

Patent Document 1: JP Japanese Patent Publication (Kokai) No. 10-171844A (1998)

DISCLOSURE OF THE INVENTION

Problems to be Solved by the Invention

By the way, typical information leakage measures include "encryption" and "take-out control", but as described above, they differ in measures and management method. Therefore, conventionally, most of the "encryption" and "take-out control" are managed separately by a different tool. However, such a separate management cannot unitarily manage the operation of managers. As a result, one of the "encryption" and "take-out control" measures is left unfinished, or although a tool is introduced, the measure status after its introduction is not checked. These problems can be fixed by allowing the manager to clearly define the operation method and perform the operation by using an asset management tool and an operation log acquisition tool at the same time.

However, it takes a lot of time and effort to use separate tools to check whether or not the security policies set by the company are violated. In addition, when the logs collected by the operation log acquisition tool are manually confirmed, checks may not be done or check errors may occur. Moreover, regarding the user's operation logs which are often acquired as part of the "take-out control" measures, more and more managers do not routinely perform periodical inspections simply because they do not know how to check the acquired logs, and think it enough to perform an inspection only when something happens.

In view of such circumferences, the present invention provides a security measure status self-checking system which can determine the measure status in a more simplified and effective manner by focusing on the information leakage measure in the security measures, managing the PC's security measure status and the user's take-out operation log in an integrated and unitary manner, and providing security policy samples.

Means for Solving the Problems

In order to solve the above problems, the present invention is characterized to be a security measure status self-checking system applied to a system having a server computer and a plurality of client computers. In the security measure status self-checking system, the client computer includes: collection means which collects security inventory information which is information about local hardware and software resources, an IT environment use status which is information about the setting environment of these resources, and operation log information which is history information about the local user operations; and collected information transmission means which transmits the collected information to the server computer; and the server computer includes: storage means which stores security inventory information, an IT environment use status, and operation log information transmitted from the client computer; security policy storage means which stores a security policy which is data indicating a policy about a security measure status; policy conformance inspection means which reads the security inventory information, the IT environment use status, and the operation log information of each client computer stored in the storage means and determines whether or not it conforms to the security policy stored in the security policy storage means; information display means which displays an inspection result by the policy conformance inspection means; and notification means which notifies a manager of a policy violation when the policy violation is detected by the policy conformance inspection means.

When the number of detected violations exceeds a predetermined threshold, it is preferable that the information display means in the server computer displays level information indicating the effect together with a policy check result. Further, it is preferable that the client computer includes warning execution means for outputting a warning based on a warning instruction transmitted from the server computer, and when a policy violation is detected, the server computer transmits a warning instruction to the client computer where the policy violation is detected. In this case, when the number of policy violations detected in the client computer exceeds a predetermined threshold, it is preferable that the warning instruction is transmitted to the client computer. It is preferable that the security policy includes a computer measure status policy which is a condition for checking the security inventory information and the IT environment use status; and a take-out control measure status policy which is a condition for checking the operation log information.

Further characteristics of the present invention will be clarified hereinafter by the best mode for carrying out the invention and the accompanying drawings.

Advantages of the Invention

The security measure status self-checking system in accordance with the present invention has following advantages.

(1) The PC security measure status and the user's take-out operation status difficult to be unitarily managed can be integratedly managed.

(2) The current status understanding and management of the security measure status can be quickly started by providing samples of check items and check methods which concern the manager when performing security measures.

(3) It is automatically checked whether or not there is conforming to the policy. If a policy violation is found, the violation content is displayed on a screen, and the manager can be automatically notified.

(4) User security awareness and morale boosting can be increased by executing a warning to a computer causing a policy violation.

BRIEF DESCRIPTION OF THE DRAWINGS

FIG. 3 is an example of a security policy checking condition of a computer measure status.

FIG. 4 is an example of a security policy setting condition of a computer measure status.

FIG. 6 is an example of a security policy setting condition of a take-out control measure status.

DESCRIPTION OF SYMBOLS

Figure 1:
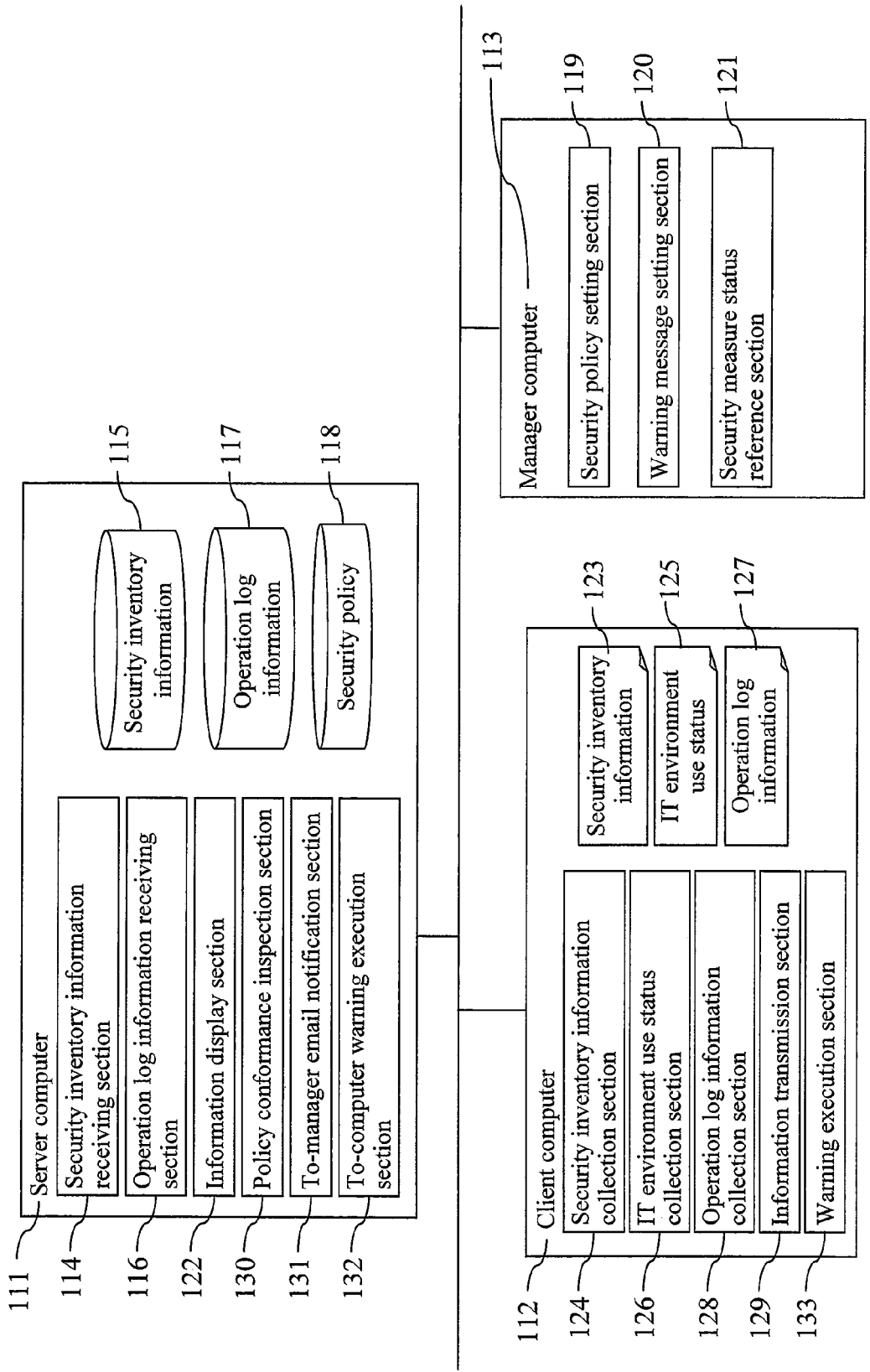
FIG. 1 is a system configuration view illustrating an embodiment of the present invention.

111 . . . Server computer
112 . . . Client computer
113 . . . Manager computer
114 . . . Security inventory information receiving section
115 . . . Security inventory information
116 . . . Operation log information receiving section
117 . . . Operation log information
118 . . . Security policy
119 . . . Security policy setting section
120 . . . Warning message setting section
121 . . . Security measure status reference section
122 . . . Information display section
123 . . . Security inventory information
124 . . . Security inventory information collection section
125 . . . IT environment use status
126 . . . IT environment use status collection section
127 . . . Operation log information
128 . . . Operation log information collection section
129 . . . Information transmission section
130 . . . Policy conformance inspection section
131 . . . To-manager email notification section
132 . . . To-computer warning execution section
133 . . . Warning execution section

BEST MODE FOR CARRYING OUT THE INVENTION

Hereinafter, an embodiment of the security measure status self-checking system to which the present invention is applied will be described.

FIG. 1 is a system configuration view illustrating an example of an embodiment of the present invention. The present system includes a server computer 111, a client computer 112, and a manager computer 113. The server computer 111 and the client computer 112 each have not only an execution section but also a data section. The figure illustrates only one client computer 112, but usually a plurality of client computers 112 are present.

The server computer 111 has a data base (DB), and stores information transmitted from the client computer 112 therein. Inventory information is received in the security inventory information receiving section 114, and is stored in the security inventory information 115. Operation log information is received in the operation log information receiving section 116, and stored in the operation log information 117. The DB not only consolidates information received from the client computer 112 but also stores a security policy 118 which is information for checking the information. The security policy 118 is accessed and edited by the security policy setting section 119 of the manager computer 113 to customize information necessary for checking or by the warning message setting section 120 thereof to customize a message to be transmitted when a policy violation is detected. The manager computer 113 also includes a security measure status reference section 121, which can be used to refer to various kinds of DB information in the server computer 111 via an information display section 122.

The client computer 112 includes a security inventory information collection section 124 for collecting security inventory information 123, an IT environment use status collection section 126 for collecting an IT environment use status 125, and an operation log information collection section 128 for collecting operation log information 127. The information collected by these collection sections is transmitted to the server computer 111 by an information transmission section 129, and is stored in the DBs 115 and 117 in the server computer 111. More specifically, the security inventory information 123 and the IT environment use status 125 are stored in the security inventory information 115 (hereinafter security inventory information refers to including an IT environment use status), and the operation log information 127 is stored in the operation log information 117.

A policy conformance inspection section 130 in the server computer 111 refers to the information received from the client computer 112 and consolidated in the DBs 115 and 117, and periodically performs automatic checks based on the content of the security policy 118 which has been set in advance. As a result of automatic checks, when a policy violation is found, a to-manager email notification section 131 makes a notification to the manager by email, and the content of the policy violation is reflected in the information display section 122. In addition, if necessary, an instruction can be transmitted to a warning execution section 133 of the client computer 112 causing the policy violation via a to-computer warning execution section 132 so that a warning message can be displayed on a screen of the client computer 112. It should be noted that the server computer 111, the client computer 112, and the manager computer 113 are connected via a LAN.

Figure 2:
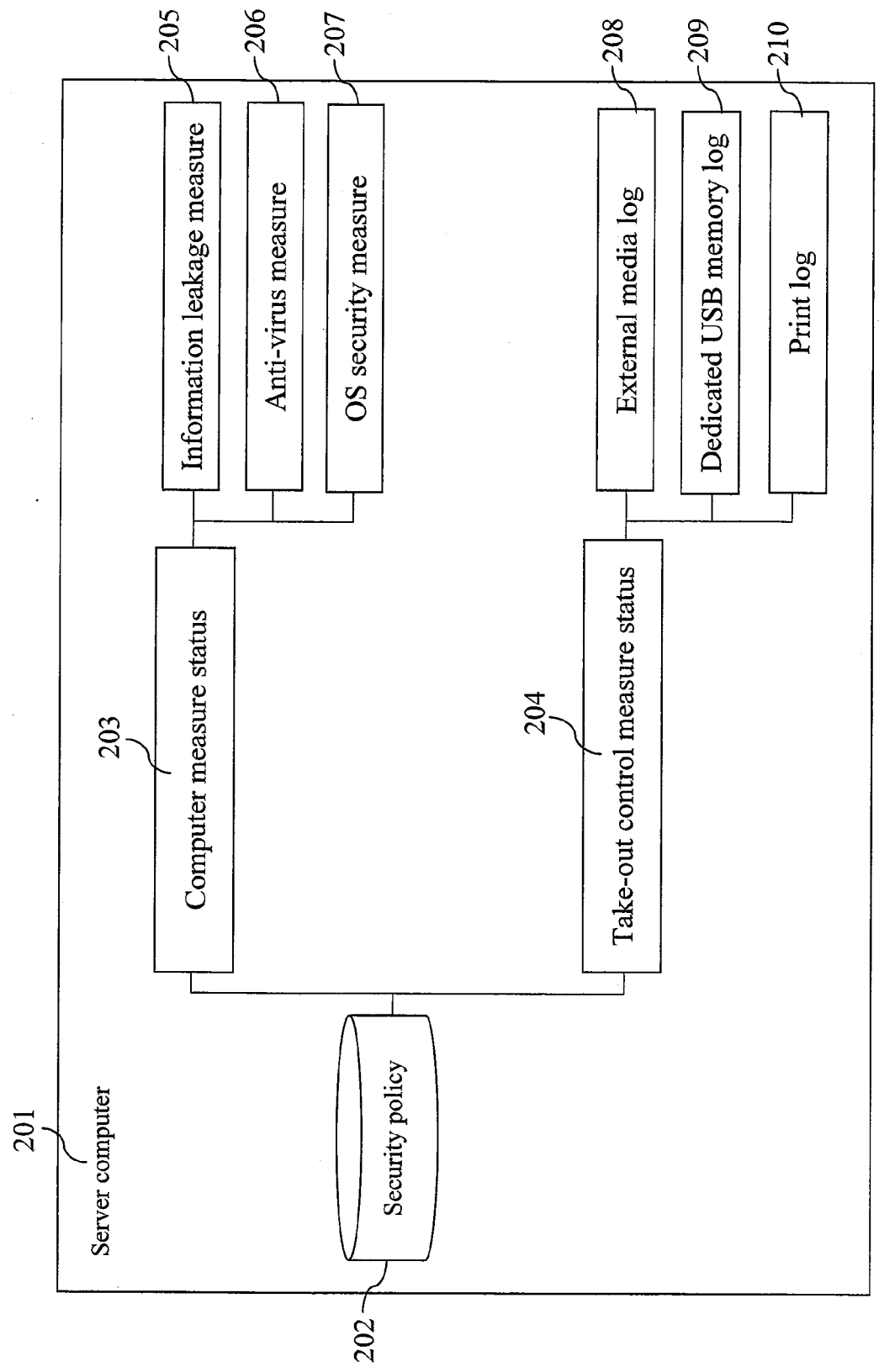
FIG. 2 is an explanatory category drawing of policies set to a security policy.

FIG. 2 is an example of the configuration of a security policy 202 (118 of FIG. 1) defined in the server computer 201 (111 of FIG. 1). The security policy 202 is broadly divided into two categories: a computer measure status 203 and a take-out control measure status 204. The security policy set to the computer measure status 203 is provided for checking the security inventory information 115 collected from the client computer 112 and consists of three categories: an information leakage measure (in a narrow sense) 205, an anti-virus measure 206, and an OS security measure 207. For example, the information leakage measure 205 sets a policy for checking whether or not encryption software and take-out control software required for preventing information leakage from the client computer are correctly installed. Likewise, the anti-virus measure 206 and the OS security measure 207 also set a policy for checking from the point of view whether or not necessary software, OS patches, and the like are correctly installed.

The security policy set to the take-out control measure status 204 is a policy for checking the operation log information 117 collected from the client computer 112, and consists of three categories: an external media log 208, a dedicated USB memory log 209, and a print log 210. The external media log 208 has a policy set for checking the logs about a copy operation performed on a floppy disk (FD) and a USB memory in the client computer 112. The dedicated USB memory log 209 has a policy set for checking the logs about a copy operation performed on a USB memory which is not a usual USB memory in the client computer 112 but a special USB memory whose use is permitted by the self-checking system. The print log 210 has a policy set for checking the logs about a printer output executed in the client computer 112.

Regarding these security policies, the check items and check methods expected to be mainly used are provided as a sample so as to quickly start the current status understanding and management of the security measure.

FIG. 3 illustrates an example of the information leakage measure checking policy 301 (205 of FIG. 2), the anti-virus measure checking policy 302 (206 of FIG. 2), and the OS security measure checking policy 303 (207 of FIG. 2) of the checking conditions set as a security policy about the computer measure status. In this example, the number of items which can be set as the information leakage measure checking policy 301 is assumed to be three. For the encryption 304 and the take-out control software 305, necessary software is defined as the information leakage measure checking condition 306, and a check is made to see whether or not the software has been introduced. For illegal application execution 307, an illegal application is defined as the information leakage measure checking condition 306, and a check is made to see whether or not the application is executed.

In this example, the number of items which can be set as the anti-virus measure checking policy 302 is assumed to be three. For an anti-virus measure software 308, necessary anti-virus measure software is defined as the anti-virus measure checking condition 309, and a check is made to see whether or not the software has been introduced. For a pattern definition file 310, the latest pattern definition file version is set in the security policy of the server computer, and a check is made to see whether or not the pattern definition file used in the anti-virus measure software executed in the client computer side is correctly updated. For a virus scan execution status 311, a check is made to see whether or not the virus scan is executed periodically by the client computer.

The number of items which can be set as the OS security measure checking policy 303 is assumed to be one. For an OS security patch 312, a check is made to see whether or not the OS security patch required for the client computer is correctly applied as the OS security measure checking condition 313.

FIG. 4 is an example of a setting of a security policy of the computer measure status. The policy category 401 consists of three categories: a information leakage measure 402, an anti-virus measure 403, and an OS security measure 404, to each of which a security policy can be set as the checking policy 405 with the same content as illustrated in FIG. 3. Here, every checking policy is not necessarily used. For the checking policy 405, when a security policy is actually to be used, "present" is set to the check 406, and when the security policy is not to be used as a check condition, "none" is set thereto. When "present" is selected in the check 406, three more parameters need to be set.

The first parameter is a warning level 407, to which the threshold of the number of client computers violating the checking policy of a security policy is set. A check is made once per day for each client computer to see whether or not it complies with or violates the content set to the security policy. When the number of violating client computers at the time of check is equal to or greater than the threshold thereof, a message to that effect is displayed as a violation level "warning" in the information display section 122 of the server computer 111.

The second parameter is a caution level 408, to which the threshold of the number of client computers violating the checking policy is specified in the same manner as for the warning level 407 except that a lower value than that for the warning level 407 is set. When the number of client computers violating the checking policy is equal to or greater than the caution level 408 and less than the warning level 407, a message to that effect is displayed as a violation level "caution" in the information display section 122 of the server computer 111.

The third parameter is a warning at violation 409, to which it is set whether or not to issue a warning as a corrective action to the client computer violating the checking policy. When a warning is to be issued to the client computer violating the security policy, an email warning illustrated in 410 or a desktop warning illustrated in 411 is specified. In the case where the email warning 410 is specified, a warning is issued to the client computer by email immediately when a violation is determined regarding the checking policy at the timing of checking the security policy performed once per day. The warning message to be transmitted to the client computer at this time can be arbitrarily customized by setting the security policy 118 of the server computer 111 from the warning message setting section 120 of the manager computer 113. In the case where the desktop warning 411 is specified, a warning is issued to the client computer determined as a violation at the timing of checking the security policy in the same manner as in the case where the email warning 410 is specified, except that the timing of executing the warning is not immediate, but at the timing when the client computer accesses the server computer 111. In the case where the "none" as illustrated in 412 is set to the warning at violation 409, even if a violating client computer is found at the time of executing the security policy check, no warning is issued to the client computer with only the information to that effect reflected on the information display section 122 of the server computer 111.

Figure 5:
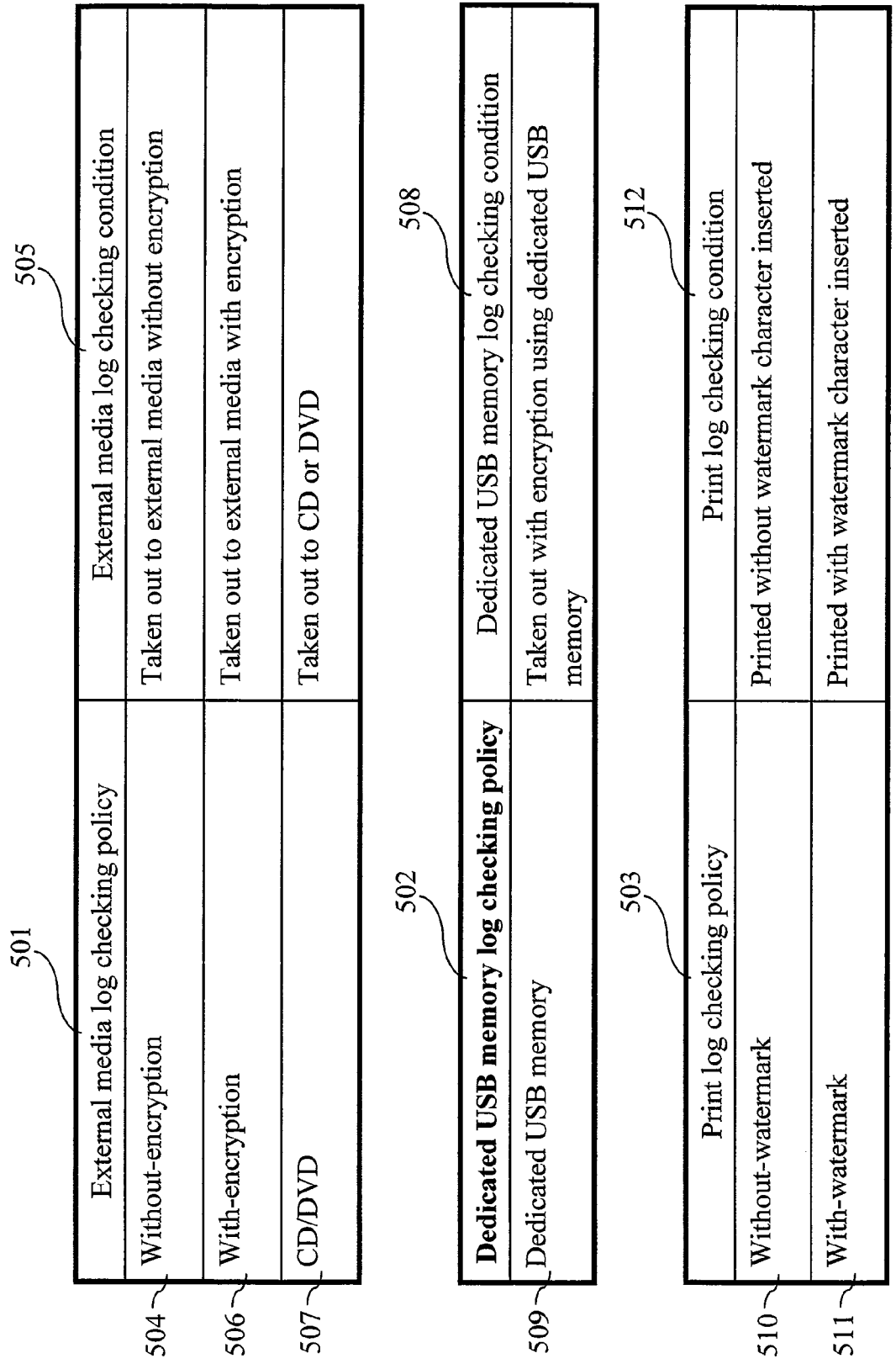
FIG. 5 is an example of a security policy checking condition of a take-out control measure status.

FIG. 5 illustrates an example of the external media log checking policy 501 (208 of FIG. 2), the dedicated USB memory log checking policy 502 (209 of FIG. 2), and the print log checking policy 503 (210 of FIG. 2) of the checking conditions set as a security policy about the take-out control measure status.

The external media log checking policy 501 specifies the checking condition of the log related to the take-out operation of a USB memory other than the dedicated USB memory whose use is permitted by the self-checking system, an FD, a CD/DVD, and the like. Without-encryption 504 specifies the checking condition of the log related to the operation that the take-out data is not encrypted of the take-out operations performed on the external media other than the CD/DVD as the external media log checking condition 505. With-encryption 506 specifies the checking condition of the log related to the operation that the take-out data is encrypted of the take-out operations performed on the external media other than the CD/DVD. The CD/DVD 507 specifies the checking condition of the log related to the take-out operation performed on the CD-ROM or DVD.

The dedicated USB memory log checking policy 502 specifies the dedicated USB memory log checking condition 508 regarding the dedicated USB memory 509. The dedicated USB memory 509 specifies the checking condition for checking the log outputted when a special USB memory whose use is permitted by the self-checking system is used.

The print log checking policy 503 specifies the checking condition 512 depending on whether or not a forced watermark character insertion printing is enabled for printed matter which can be handled by the self-checking system. Without-watermark 510 checks the log when normal printing is performed without a watermark character inserted. With-watermark 511 checks the log when printing is performed with a watermark character inserted.

FIG. 6 is an example of the setting of a security policy of the take-out control measure status. The policy category 601 consists of three categories: an external media log 602, a dedicated USB memory log 603, and a print log 604, to each of which a security policy can be set as the checking policy 605 with the same content illustrated in FIG. 5. Here, every checking policy is not necessarily used. For the checking policy 605, when a security policy is actually to be used, "present" is set to the check 606, and when the security policy checking condition is not to be used, "none" is set thereto. When "present" is selected in the check 606, four more parameters need to be set.

The first parameter is a warning level 607, to which the threshold of the number of checking policy violations is set. A check is made once per day to see whether or not there is compliance with or violation of the check content set to the security policy. When the total number of violations found by checking the log information (total sum of violations in all clients) is equal to or greater than the threshold thereof, a message to that effect is displayed as the violation level "warning" in the information display section 122 of the server computer 111. Unlike the threshold of the computer measure status (407 of FIG. 4), the threshold of the warning level 607 is not the number of violating computers but the total number of violations found by checking the log acquired as the take-out log.

The second parameter is a caution level 608, to which the threshold of the number of checking policy violations is specified in the same manner as for the warning level 607 except that a lower value than that for the warning level 607 is set. When the total number of checking policy violations is equal to or greater than the caution level 608 and less than the warning level 607, a message to that effect is displayed as the violation level "caution" in the information display section 122 of the server computer 111.

The third parameter is a warning threshold 609. The warning threshold 609 is a parameter set in only the security policy related to the take-out control measure status. When a security policy violation is found in the take-out control measure status, warning is issued to the client computer in such a manner as when the number of violations in the client computer exceeds the set threshold 609, the warning is issued to the client computer. The information reflected in the information display section 122 of the server computer 111 should be displayed based on the total number of violations in the log (total sum of violations in all clients). For the warning at violation 610 performed in each client computer, the threshold of the number of violations for each individual client computer should be set. If not, a warning is always issued when an incorrect operation is performed even once. With that in mind, the warning threshold 609 can be set to issue a warning to the client computer in such a manner as the warning is issued only when the number of violations exceeds a predetermined value in each client computer.

The fourth parameter is a warning at violation 610, to which it is set which warning should be issued as a corrective action to the client computer violating the checking policy. When a warning is to be issued to the client computer violating the checking policy, an email warning illustrated in 611 or a desktop warning illustrated in 612 is specified. In the case where the email warning 611 is specified, an email warning is issued to the client computer immediately when a violation is determined (when the number of violations in the client computer exceeds the warning threshold 609) at the timing of checking the security policy performed once per day. The warning message to be transmitted to the client computer at this time can be arbitrarily customized by setting the security policy 118 of the server computer 111 from the warning message setting section 120 of the manager computer 113. In the case where the desktop warning 612 is specified, a warning is issued to the client computer determined as a violation (the number of violations in the client computer exceeds the warning threshold 609) at the timing of checking the security policy in the same manner as in the case where the email warning 611 is specified, except that the timing of executing the warning is not immediate, but at the timing when the client computer accesses the server computer 111. In the case where the "none" as illustrated in 613 is set to the warning at violation 610, even if a violating client computer is found at the time of executing the security policy check, no warning is issued to the client computer with only the information to that effect reflected in the information display section 122 of the server computer 111.

Figure 7:
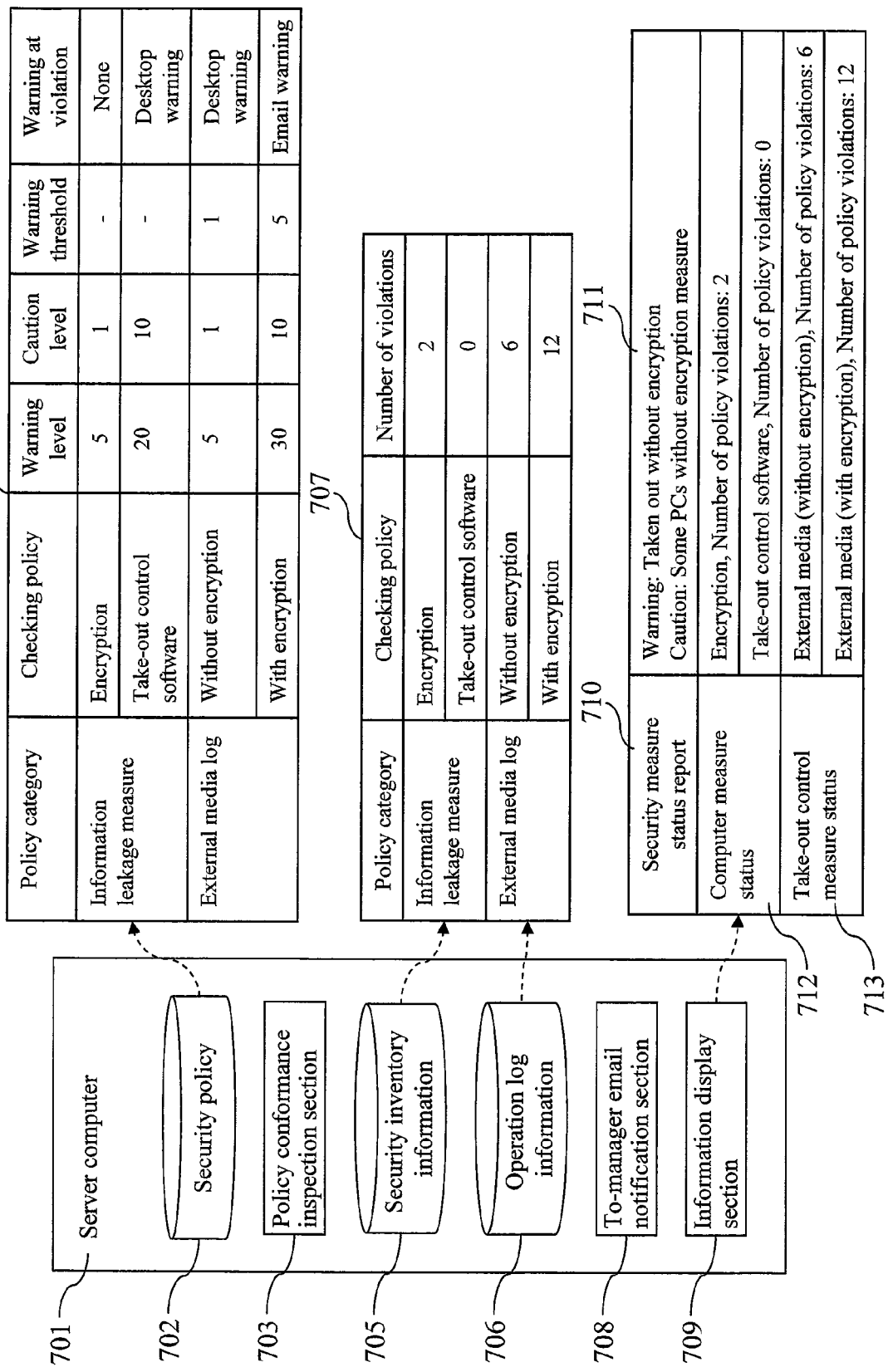
FIG. 7 is an example of self-checking a security measure status.

FIG. 7 is an example of illustrating what is displayed in information display section 122 of the server computer 111 when the security measure status self-checking is performed. The server computer 701 (111 of FIG. 1) performs a policy self-checking once per day based on the security policy 702 (118 of FIG. 1) which has been set from the manager computer 113 in advance. The security policy 702 is assumed to be set as illustrated in a security policy example 704. The policy conformance inspection section 703 (130 of FIG. 1) refers to the security policy such as the security policy example 704 to determine the policy category required to be checked and the content of the checking policy and acquires the necessary information from the security inventory information 705 (115 of FIG. 1) and the operation log information 706 (117 of FIG. 1). The security inventory information 705 and the operation log information 706 are assumed to have the information collected from each client 112 already stored therein.

As a result of checking, the policy conformance inspection section 703 outputs the number of checking policy violations as the policy check result 707. Here, an assumption is made that the number of checking policy violations related to the encryption of the information leakage measure is 2, the number of checking policy violations related to the take-out control software is 0, the number of checking policy violations related to the without-encryption of the external media log is 6, and the number of checking policy violations related to the with-encryption is 12. When one or more violations are found in each checking policy, a message to that effect is issued to the manager's email address from the to-manager email notification section 708 (131 of FIG. 1). The email address used as the transmission destination of this notification, the message content of the email to be transmitted at violation detection, and the like are required to be preliminarily defined in the security policy 702 by the warning message setting section 120 of the manager computer 113.

If the policy check result 707 indicates at least one violation, the outline of the violation content is displayed in the information display section 709 (122 of FIG. 1). The fields 710 to 713 are display examples of the outline of the violation content in the information display section 709. As the outline of the security measure status, a message according to the violation content is displayed in the field of the security measure status report 710. Here, the security policy example 704 has been set, and when the policy check result 707 is outputted as a result of security policy checks, the violation content outline 711 is displayed. More specifically, the caution level is "1" and the warning level is "5" related to the encryption of the information leakage measure checking policy, and the actual number of violations is 2. Therefore, a message "caution: some PCs without encryption measure" is displayed as the caution level. In addition, the warning level is "5" related to the without-encryption of the external media log checking policy, and the actual number of violations is 6. Therefore, a message "warning: taken out without encryption" is displayed as the warning level. Although not illustrated, the number of violations related to the with-encryption also exceeds the caution level, and thus a message should be displayed. Note that the message to be displayed in the violation content outline 711 can be set separately for each warning level and caution level. Moreover, regarding the detail about the checked content, the number of violations is displayed in the computer measure status 712 field and the take-out control measure status 713 field individually for each checking policy executed as a result of security policy violations.

It should be noted that here the description has been given of an example of displaying the violation content on the server computer, but instead of displaying the violation content on the server computer or in addition to displaying the violation content on the server computer, similar display may be performed by the manager computer.

Figure 8:
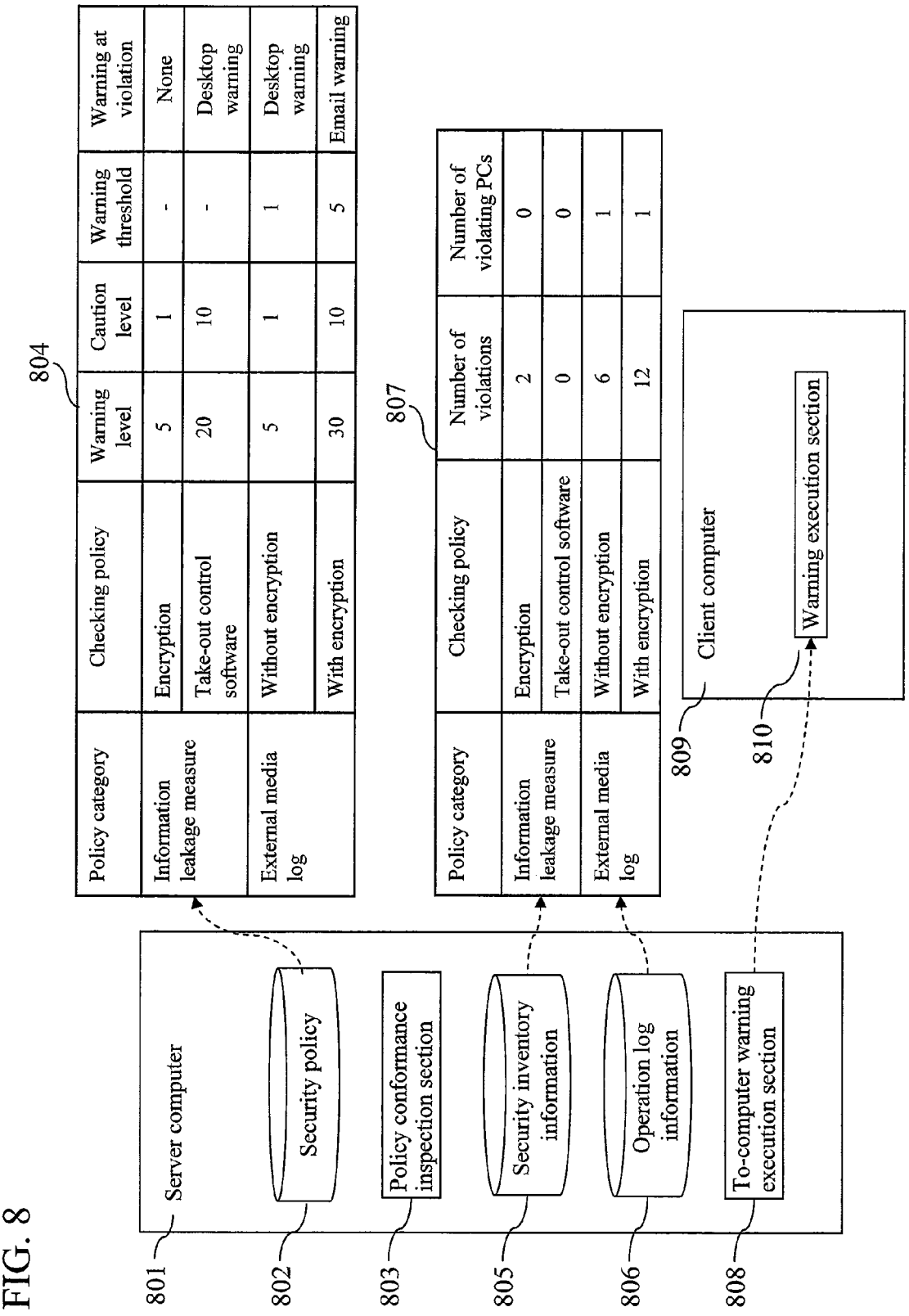
FIG. 8 is an example of a warning to a computer when a security policy violation is detected.

FIG. 8 is an example illustrating how the warning is issued from the server computer 111 to the client computer 112 when the security measure status self-checking is performed. The server computer 801 (111 of FIG. 1) performs a policy self-checking once per day based on the security policy 802 (118 of FIG. 1) which has been set from the manager computer 113 in advance. The security policy 802 is assumed to be set as illustrated in a security policy example 804. The policy conformance inspection section 803 (130 of FIG. 1) refers to the security policy such as the security policy example 804 to determine the policy category required to be checked and the content of the checking policy and acquires the necessary information from the security inventory information 805 (115 in FIG. 1) and the operation log information 806 (117 in FIG. 1). The security inventory information 805 and the operation log information 806 are assumed to have the information collected from each client 112 already stored therein.

As a result of checking, the policy conformance inspection section 803 outputs the number of policy violations and the number of violating PCs as the policy check result 807. However, when "None" is set to the "warning at violation" of the security policy, the number of violating PCs is not collected. Further, regarding the policy category ("information leakage measure", "anti-virus measure", and "OS security measure", of which FIG. 8 illustrates only "information leakage measure") belonging to the computer measure status (203 of FIG. 2) of the security policy, the number of violating PCs is the same as the number of violations. This is because in this category, the number of violations in the policy checking is counted in units of PCs. In contrast, regarding the policy category ("external media log", "dedicated USB memory log", and "print log", of which, FIG. 8 illustrates only "external media log") belonging to the take-out control measure status (204 of FIG. 2) of the security policy, the number of violating PCs is not always the same as the number of violations. This is because the number of violations indicates the total sum of the policy violations related to a file taken out of each PC, while the number of violating PCs indicates the number of PCs where such a policy violation occurs.

More specifically, the policy conformance inspection section 803 acquires the log information from the operation log information 806, and checks whether or not the number of violations is equal to or greater than the "warning threshold" indicated in the security policy example 804 for each client computer. For example, with reference to the policy check result 807, the number of violations is 12 and the number of violating PCs is 1 which are indicated in the with-encryption row of the external media log checking policy. This means that the total number of logs related to the security policy violation is 12, but only one PC exceeds the warning threshold of 5 indicated in the security policy example 804 when the number of violations is checked for each computer.

When the number of violating PCs is 1 or more in the policy check result 807, the to-computer warning execution section 808 (132 of FIG. 1) issues a warning to the client computer according to the content set in the warning at violation field. When the email warning is set in the warning at violation field, the warning is issued by email immediately when the security policy violation is determined. When the desktop warning is set in the warning at violation field, the to-computer warning execution section 808 instructs the warning execution section 810 (133 of FIG. 1) of the client computer 809 (112 of FIG. 1) to execute a warning to the desktop. Note that unlike the email warning, the warning to the desktop is not executed immediately but executed when some communication occurs from the client computer 809 to the server computer 801.

Figure 9:
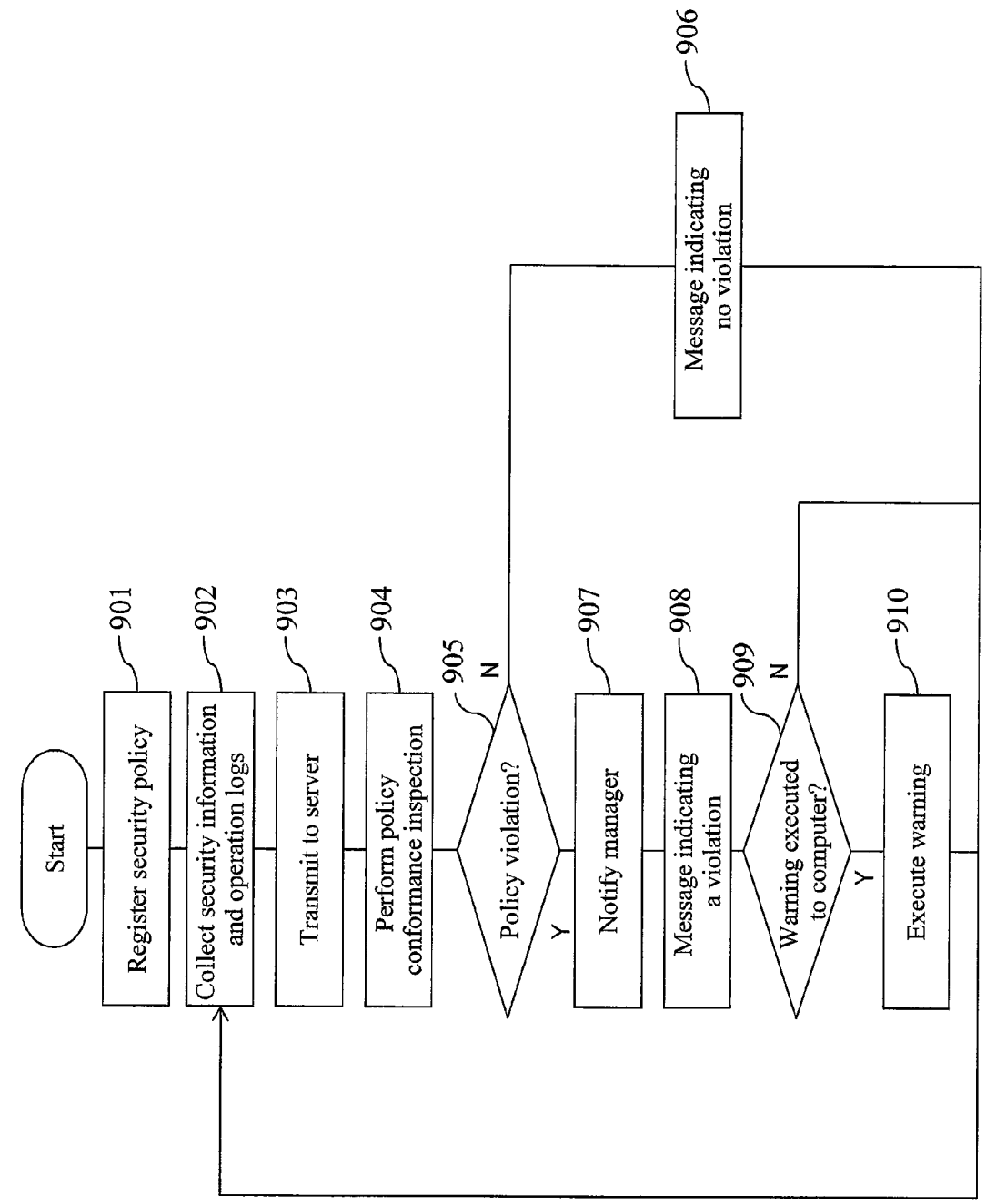
FIG. 9 is a flowchart illustrating a process of the security measure status self-checking system.

FIG. 9 is a flowchart illustrating a process procedure for the security measure status self-checking system of the present embodiment. First, the security policy is registered in the server 111 from the manager computer 113 (Step 901). Here, the content to be registered is the content to be executed as security measure checking by the company using the self-checking system. The client computer 112 periodically collects the security information and operation logs (Step 902), and transmits the logs to the server 111 (Step 903). The information collection by the client computer 112 and the transmission to the server 111 are automatically performed without user awareness. The server computer 111 performs the policy conformance inspection according to the content set in the security policy 118 (Step 904). As a result of the policy conformance inspection, if no policy violation is determined (N: Step 905), a message indicating no violation is displayed in the information display section 122 of the server computer 111 (Step 906). If one or more violations are determined (Y: Step 905), the manager computer 113 is notified (Step 907), and a message indicating a violation is displayed in the information display section 122 of the server computer 111 (Step 908). If there is a security policy violation, a check is made to see whether or not warning is executed to the violating client computer 112 (Step 909). If the security policy specifies that warning is executed, the warning is executed (Step 910).

The invention claimed is:

1. A security measure status self-checking system applied to a system having a server computer and a plurality of client computers, the client computer including:

collection means for collecting security inventory information which is information regarding local hardware and software resources, an IT environment use status which is information regarding setting environment of the local hardware and software resources, and operation log information which is history information regarding local user operations on the client computer; and collected information transmission means for transmitting the collected information to the server computer; and the server computer including:

storage means for storing the collected information including the security inventory information, the IT environment use status, and the operation log information transmitted from one or more of the client computers;

security policy storage means for storing a security policy which is data indicating a policy regarding the security measure status of the self-checking system;

policy conformance inspection means for reading the security inventory information, the IT environment use status, and the operation log information of each client computer stored in the storage means and determines whether or not a security policy violation has occurred by checking whether the security inventory information, the IT environment use status, and the operation log information of each client computer stored in the storage means conforms to the security policy stored in the security policy storage means;

information display means for displaying an inspection result by the policy conformance inspection means, when a number of client computers that violate a security policy exceeds a predetermined threshold, the information display means of the server computer displays a violation level warning indicating that the security policy has been violated; and notification means for notifying the security policy violation to a manager of the self checking system when the security policy violation is detected by the policy conformance inspection means, wherein a method by which the manager is notified is pre-selected, wherein the security policy includes (i) a computer measure status policy which is one or more conditions for checking the security inventory information and the IT environment use status; and (ii) a take-out control measure status policy which is one or more conditions for checking the operation log information, wherein the policy conformance inspection means determines that the security policy violation has occurred when a number of occurrences of violating the computer measure status policy is once or more during a predetermined period or when a number of occurrences of violating the take-out control measure status policy exceeds a threshold during the predetermined period, wherein the one or more conditions of the computer measure status policy relate to the installation, execution or updating of software, and wherein the one or more conditions of the take-out control measure status policy relate to the transfer of data to external media, CD or DVD, dedicated USB memory or printing of data with a watermark.

2. The security measure status self-checking system according to claim 1, wherein the client computer further includes warning execution means for outputting a warning based on a warning instruction transmitted from the server computer, and when the security policy violation is detected by the policy conformance inspection means, the server computer transmits a warning instruction to the client computer where the security policy violation is detected.

3. The security measure status self-checking system according to claim 2, wherein when the number of security policy violations detected in the client computer exceeds a predetermined threshold, the means for transmitting the warning instruction of the server computer transmits the warning instruction to the client computer.

4. The security measure status self-checking system according to claim 1, wherein the one or more conditions of the computer measure status policy include one or more of whether encryption software is installed, whether take-out control software is installed, whether illegal software has been executed, whether anti-virus software is installed, whether a pattern definition file is up to date, whether a virus scan is periodically executed, and whether a security patch has been installed, and the one or more conditions of the take-out control measure status policy include one or more of whether data has been taken to external media without encryption, whether data has been taken to external media with encryption, whether data has been written to CD or DVD, whether data has been taken to a dedicated USB memory device, and whether printing has occurred with a watermark.

5. The security measure status self-checking system according to claim 2, wherein the one or more conditions of the computer measure status policy include one or more of whether encryption software is installed, whether take-out control software is installed, whether illegal software has been executed, whether anti-virus software is installed, whether a pattern definition file is up to date, whether a virus scan is periodically executed, and whether a security patch has been installed, and the one or more conditions of the take-out control measure status policy include one or more of whether data has been taken to external media without encryption, whether data has been taken to external media with encryption, whether data has been written to CD or DVD, whether data has been taken to a dedicated USB memory device, and whether printing has occurred with a watermark.

* * * * *